United States Patent
Yang et al.

(10) Patent No.: US 9,510,334 B2
(45) Date of Patent: *Nov. 29, 2016

(54) METHOD AND DEVICE FOR ACK/NACK TRANSMISSION IN TDD-BASED WIRELESS COMMUNICATION SYSTEM

(71) Applicant: LG ELECTRONICS INC., Seoul (KR)

(72) Inventors: Suck Chel Yang, Anyang-si (KR); Joon Kui Ahn, Anyang-si (KR); Dong Youn Seo, Anyang-si (KR); Min Gyu Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/958,703

(22) Filed: Dec. 3, 2015

(65) Prior Publication Data

US 2016/0088612 A1 Mar. 24, 2016

Related U.S. Application Data

(63) Continuation of application No. 14/527,447, filed on Oct. 29, 2014, now Pat. No. 9,226,276, which is a (Continued)

(51) Int. Cl.
*H04W 72/00* (2009.01)
*H04W 72/04* (2009.01)
(Continued)

(52) U.S. Cl.
CPC ........ *H04W 72/0413* (2013.01); *H04J 3/1694* (2013.01); *H04L 1/1621* (2013.01);
(Continued)

(58) Field of Classification Search
USPC ........ 370/230–231, 235, 276–278, 280, 294, 370/314; 714/18, 809–810, 748–749
See application file for complete search history.

(56) References Cited

U.S. PATENT DOCUMENTS 7,912,007 B2 3/2011 Fan et al.
8,108,757 B2 * 1/2012 Ahn ...................... H04L 1/1812
714/776

(Continued)

FOREIGN PATENT DOCUMENTS

CN 101499882 A 8/2009
CN 101689984 A 3/2010

(Continued)

OTHER PUBLICATIONS

LG Electronics, "ACK/NACK resource allocation in LTE-A", R1-103397, 3GPP TSG RAN WG1 #61, Montreal, Canada, May 10-14, 2010, pp. 1-5.

(Continued)

Primary Examiner — Mohamed Kamara
(74) Attorney, Agent, or Firm — Birch, Stewart, Kolasch & Birch, LLP

(57) ABSTRACT

A method of reporting control information in a wireless communication system in which M downlink time divisional duplex (TDD) subframes are associated with an uplink TDD subframe. A user equipment (UE) receives resource allocation information used for a first physical uplink control channel (PUCCH) format. The UE selects a PUCCH format among a plurality of PUCCH formats including the first PUCCH format and a second PUCCH format. The second PUCCH format is selected if the UE receives a first physical downlink shared channel (PDSCH) in one of the M downlink TDD subframes on the primary cell. The UE receives a second PDSCH with a downlink assignment index (DAI) in one of the M downlink TDD subframes on the primary cell. The UE does not receive a first physical downlink control channel (PDCCH) corresponding to the first PDSCH on the primary cell.

12 Claims, 12 Drawing Sheets

Related U.S. Application Data continuation of application No. 13/883,874, filed as application No. PCT/KR2011/010312 on Dec. 29, 2011, now Pat. No. 8,891,416.

(60) Provisional application No. 61/481,713, filed on May 2, 2011, provisional application No. 61/429,175, filed on Jan. 2, 2011.

(51) Int. Cl.
| | |
|---|---|
| *H04L 1/18* | (2006.01) |
| *H04L 5/00* | (2006.01) |
| *H04J 3/16* | (2006.01) |
| *H04L 1/16* | (2006.01) |
| *H04L 27/26* | (2006.01) |
| *H04L 5/14* | (2006.01) |

(52) U.S. Cl.
CPC ........... *H04L1/1861* (2013.01); *H04L 5/0055* (2013.01); *H04L 5/14* (2013.01); *H04L 27/2602* (2013.01); *H04W 72/042* (2013.01); *H04W 72/0406* (2013.01)

(56) References Cited

U.S. PATENT DOCUMENTS

| | | | |
|---|---|---|---|
| 8,184,579 | B2 | 5/2012 | Shen et al. |
| 8,358,621 | B2 | 1/2013 | Fan et al. |
| 8,514,883 | B2 * | 8/2013 | Pan ................. H04L 1/1635 370/328 |
| 2009/0207793 | A1 | 8/2009 | Shen et al. |
| 2009/0241004 | A1 | 9/2009 | Ahn et al. |
| 2010/0027447 | A1 | 2/2010 | Choi et al. |
| 2010/0111024 | A1 | 5/2010 | Fan et al. |
| 2010/0165939 | A1 | 7/2010 | Lin |
| 2010/0281326 | A1 | 11/2010 | Ahn et al. |
| 2011/0243039 | A1 * | 10/2011 | Papasakellariou .... H04L 1/1861 370/280 |
| 2011/0280164 | A1 * | 11/2011 | Luo ................. H04L 5/001 370/281 |
| 2012/0294204 | A1 | 11/2012 | Chen et al. |

FOREIGN PATENT DOCUMENTS

| | | |
|---|---|---|
| EP | 2234303 A1 | 9/2010 |
| KR | 10-0905385 B1 | 6/2009 |

OTHER PUBLICATIONS

LG Electronics, "Uplink ACK/NACK resource allocation in TDD", R1-081257, 3GPP TSG RAN WG1 #52bis, Shenzhen, China, Mar. 31-Apr. 4, 2008, pp. 1-5.

Motorola, "Uplink ACK/NACK for Carrier Aggregation", R1-101468, 3GPP TSG RAN1#60, San Francisco, USA, Feb. 22-26, 2010, pp. 1-3.

* cited by examiner

METHOD AND DEVICE FOR ACK/NACK TRANSMISSION IN TDD-BASED WIRELESS COMMUNICATION SYSTEM

CROSS-REFERENCE TO RELATED APPLICATIONS

This is a continuation of U.S. patent application Ser. No. 14/527,447 filed on Oct. 29, 2014 (now U.S. Pat. No. 9,226,276, issued on Dec. 29, 2015), which is a continuation of U.S. patent application Ser. No. 13/883,874 filed on May 7, 2013 (now U.S. Pat. No. 8,891,416, issued on Nov. 18, 2014), which is the National Phase of PCT/KR2011/010312 filed on Dec. 29, 2011, which claims priority under 35 U.S.C. §119(e) to U.S. Provisional Application Nos. 61/481,713 filed on May 2, 2011 and 61/429,175 filed on Jan. 2, 2011, all of which are hereby expressly incorporated by reference into the present application.

BACKGROUND OF THE INVENTION

Technical Field

The present invention relates to wireless communications, and more particularly, to a method and apparatus for transmitting a reception acknowledgement for hybrid automatic repeat request (HARQ) in a wireless communication system based on time division duplex (TDD).

Background Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells.

A time division duplex (TDD) system uses the same frequency in downlink and uplink cases. Therefore, one or more downlink subframes are associated with an uplink subframe. The 'association' implies that transmission/reception in the downlink subframe is associated with transmission/reception in the uplink subframe. For example, when a transport block is received in a plurality of downlink subframes, the user equipment transmits HARQ ACK/NACK for the transport block in the uplink subframe associated with the plurality of downlink subframes.

As the TDD system uses a plurality of serving cells, a control channel having a variety of capacity for transmitting the HARQ ACK/NACK is introduced. Accordingly, there is a need for utilizing various control channels while maintaining transmission reliability of the HARQ ACK/NACK.

SUMMARY OF THE INVENTION

The present invention provides a method and apparatus for transmitting positive-acknowledgement (ACK)/negative-acknowledgement (NACK) in a wireless communication system based on time division duplex (TDD).

In an aspect, a method of transmitting an ACK/NACK in a wireless communication system based on Time Division Duplex in which M, M>1, downlink subframes are associated with an uplink subframe is provided. The method is performed by a user equipment. The method includes receiving a semi-persistent scheduling (SPS) downlink transport block on a physical downlink shared channel (PDSCH) without a corresponding physical downlink control channel (PDCCH) in one of the M downlink subframes on a serving cell, receiving a downlink grant on a detected PDCCH in one of the M downlink subframes on the serving cell, the downlink grant including a downlink assignment and a downlink assignment index (DAI), the DAI indicating an accumulative number of PDCCH with assigned PDSCH transmission, receiving a downlink transport block on a PDSCH indicated by the downlink assignment on the serving cell, determining a 2 bit ACK/NACK for the SPS downlink transport block and the downlink transport block and a resource index from a plurality of resource indexes, modulating the 2 bit ACK/NACK to generate a modulation symbol, and transmitting the modulation symbol on an uplink control channel configured by the determined resource index.

A value of the DAI may be 1.

The 2 bit ACK/NACK is modulated with Quadrature Phase Shift Keying (QPSK).

The plurality of resource indexes may include a first resource index and a second resource index. The first resource index may be a pre-determined value and the second resource index may be obtained from a resource used for the detected PDCCH having the DAI.

The downlink transport block may include a first downlink transport block and a second downlink transport block, and the plurality of resource indexes may include a first resource index, a second resource index and a third resource index. The first resource index may be a pre-determined value, the second resource index may be obtained from a resource used for the detected PDCCH having the DAI, and the third resource index may be obtained from the second resource index.

In another aspect, a wireless device configured for transmitting a ACK/NACK in a wireless communication system based on Time Division Duplex in which M, M>1, downlink subframes are associated with an uplink subframe is provided. The wireless device includes a radio frequency unit configured to transmit radio signals, and a processor operatively coupled with the radio frequency unit and configured to receive a semi-persistent scheduling (SPS) downlink transport block on a physical downlink shared channel (PDSCH) without a corresponding physical downlink control channel (PDCCH) in one of the M downlink subframes on a serving cell, receive a downlink grant on a detected PDCCH in one of the M downlink subframes on the serving cell, the downlink grant including a downlink assignment and a downlink assignment index (DAI), the DAI indicating an accumulative number of PDCCH with assigned PDSCH transmission, receive a downlink transport block on a PDSCH indicated by the downlink assignment on the serving cell, determine a 2 bit ACK/NACK for the SPS downlink transport block and the downlink transport block and a resource index from a plurality of resource indexes, modulate the 2 bit ACK/NACK to generate a modulation symbol and transmit the modulation symbol on an uplink control channel configured by the determined resource index.

A proper control channel can be selected according to a payload size of hybrid automatic repeat request (HARQ) positive-acknowledgement (ACK)/negative-acknowledgement (NACK) in a time division duplex (TDD) system having a plurality of serving cells. A base station can reduce unnecessary retransmission caused by ACK/NACK bundling.

DETAILED DESCRIPTION OF THE INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
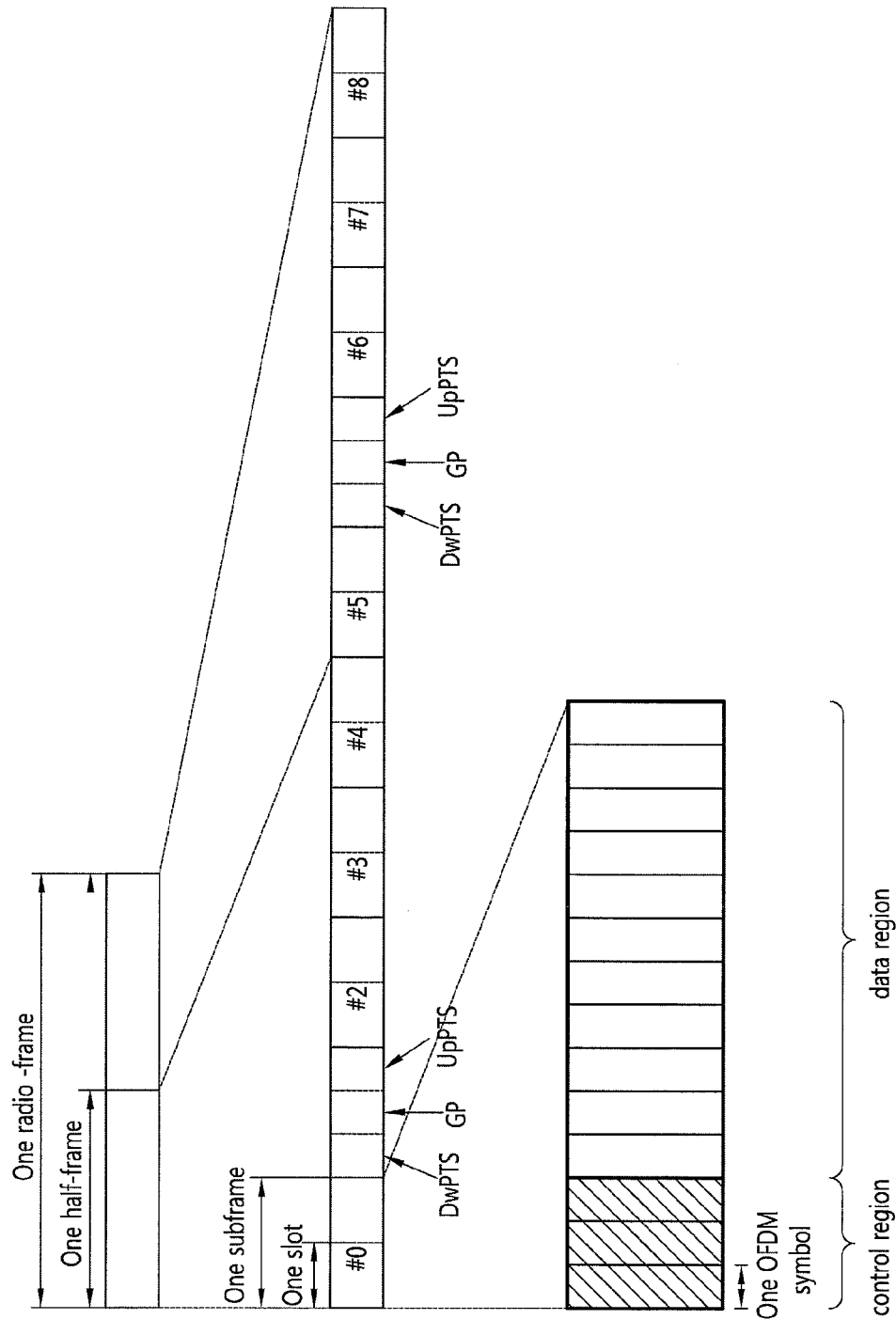
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 4 of 3GPP TS 36.211 V8.7.0 (2009-05) "Evolved Universal Terrestrial Radio Access (E-UTRA); Physical Channels and Modulation (Release 8)" may be incorporated herein by reference for time division duplex (TDD).

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
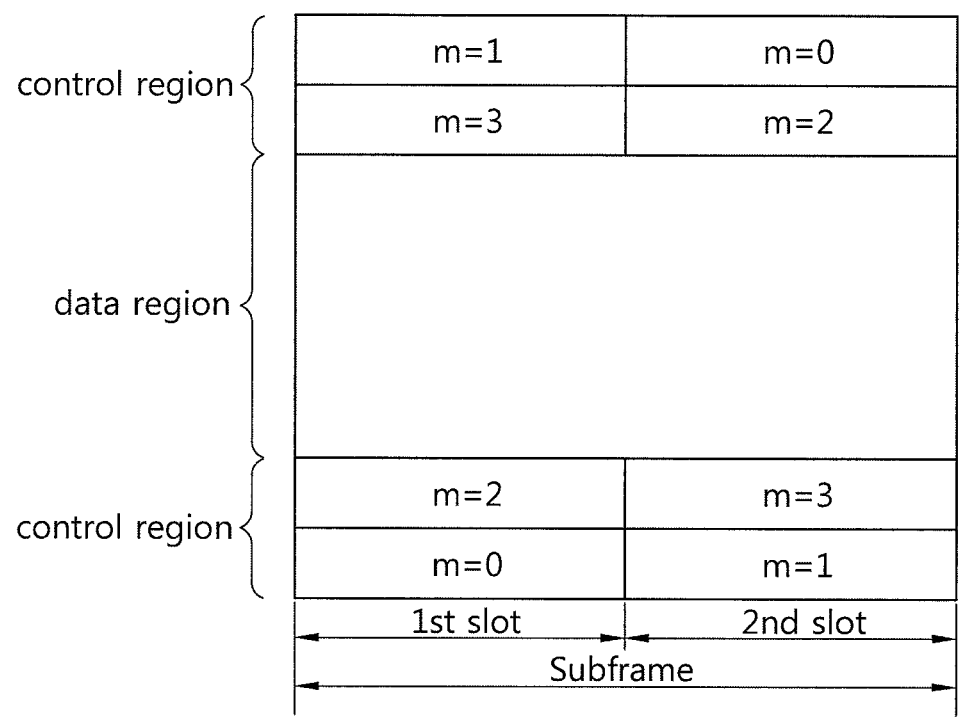
FIG. 2 shows an example of an uplink subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 2 below shows an example of a modulation scheme and the number of bits per subframe according to the PUCCH format.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

In Equation 2, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in the PUCCH format 1b will be described.

Figure 3:
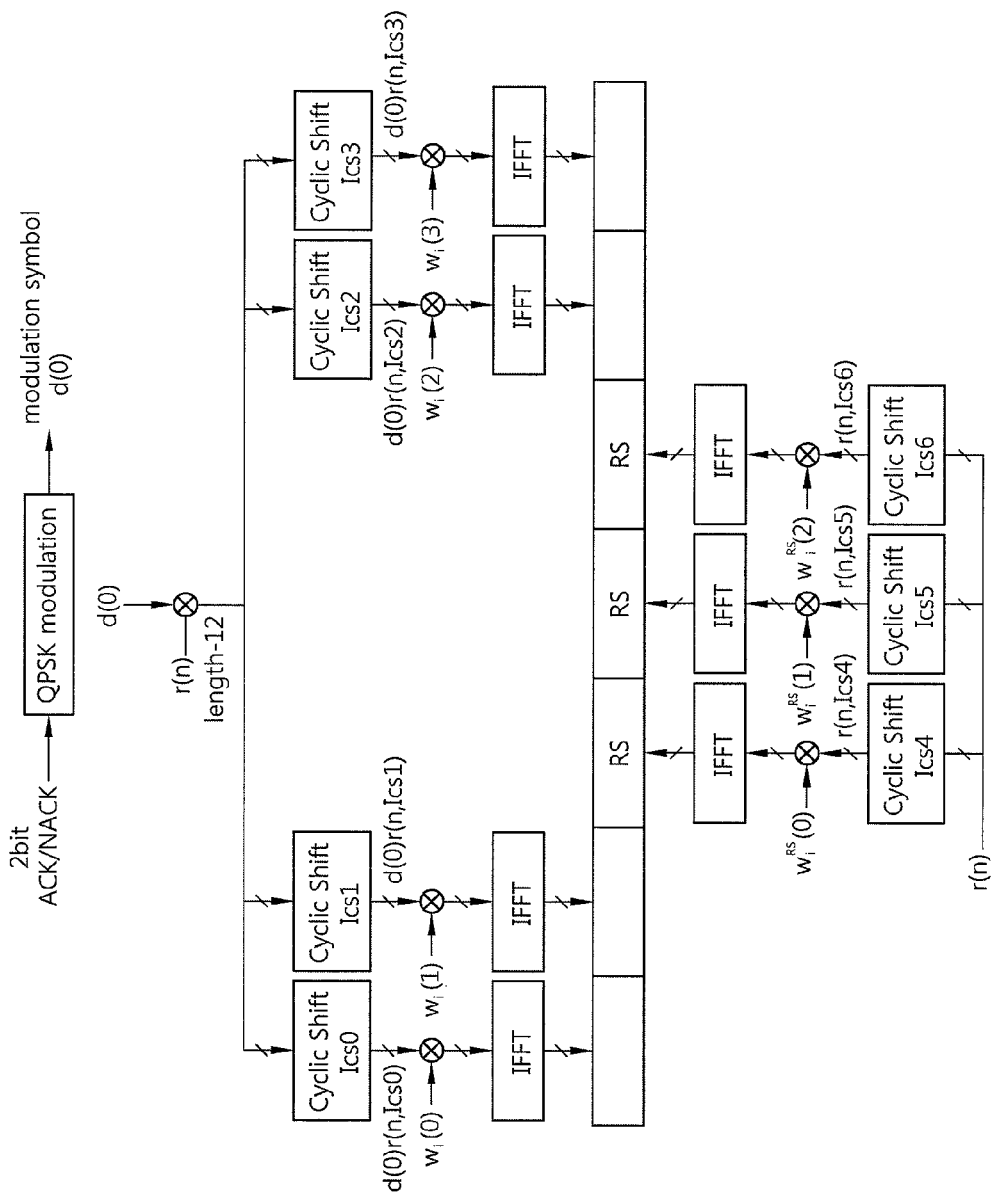
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index 1 in a slot.

In the normal CP, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n,I_{cs})$. When a one-dimensionally spread sequence mapped to an $(i+1)^{th}$ OFDM symbol in a subframe is denoted by m(i), it can be expressed as follows.

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 3

| Index (i) | [$w_i(0)$, $w_i(1)$, $w_i(2)$, $w_i(3)$] |
| --- | --- |
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 4

| Index (i) | [$w_i(0)$, $w_i(1)$, $w_i(2)$] |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, a two-dimensionally spread sequences {s(0), s(1), s(2), s(3)} can be expressed as follows.

$$\{s(0),s(1),s(2),s(3)\}=\{w_i(0)m(0),w_i(1)m(1),w_i(2)m(2),w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n,I_{cs4})$, $r(n,I_{cs5})$, and $r(n,I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed with one resource block.

In the 3GPP LTE, a resource index $n^{(1)}_{PUCCH}$ is defined in order for the UE to obtain the three parameters for configuring the PUCCH. The resource index $n^{(1)}_{PUCCH}$ is defined to $n_{CCE}+N^{(1)}_{PUCCH}$, where $n_{CCE}$ is an index of a first CCE used for transmission of corresponding DCI (i.e., DL resource allocation used to receive DL data mapped to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
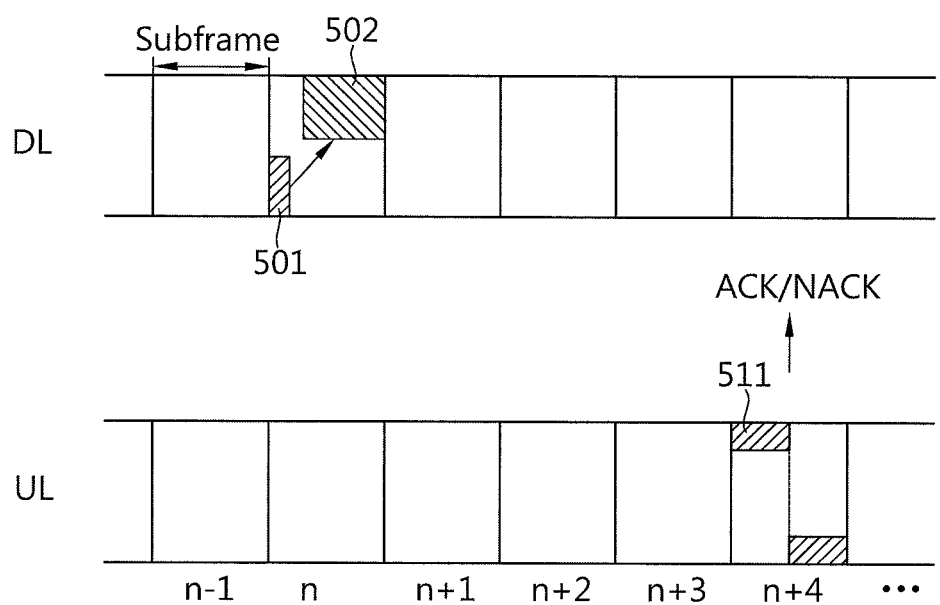
FIG. 4 shows an example of performing hybrid automatic repeat request (HARQ).

FIG. 4 shows an example of performing HARQ.

By monitoring a PDCCH, a UE receives a DL grant including a DL resource allocation on a PDCCH 501 in an $n^{th}$ DL subframe. The UE receives a DL transport block through a PDSCH 502 indicated by the DL resource allocation.

The UE transmits an ACK/NACK response for the DL transport block on a PUCCH 511 in an $(n+4)^{th}$ UL subframe. The ACK/NACK response can be regarded as a reception acknowledgement for the DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUCCH}=n_{CCE}+N^{(1)}_{PUCCH}$.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a UE communicates with a BS through a plurality of DL CCs, it can be said that the UE receives a service from a plurality of serving cells.

Figure 5:
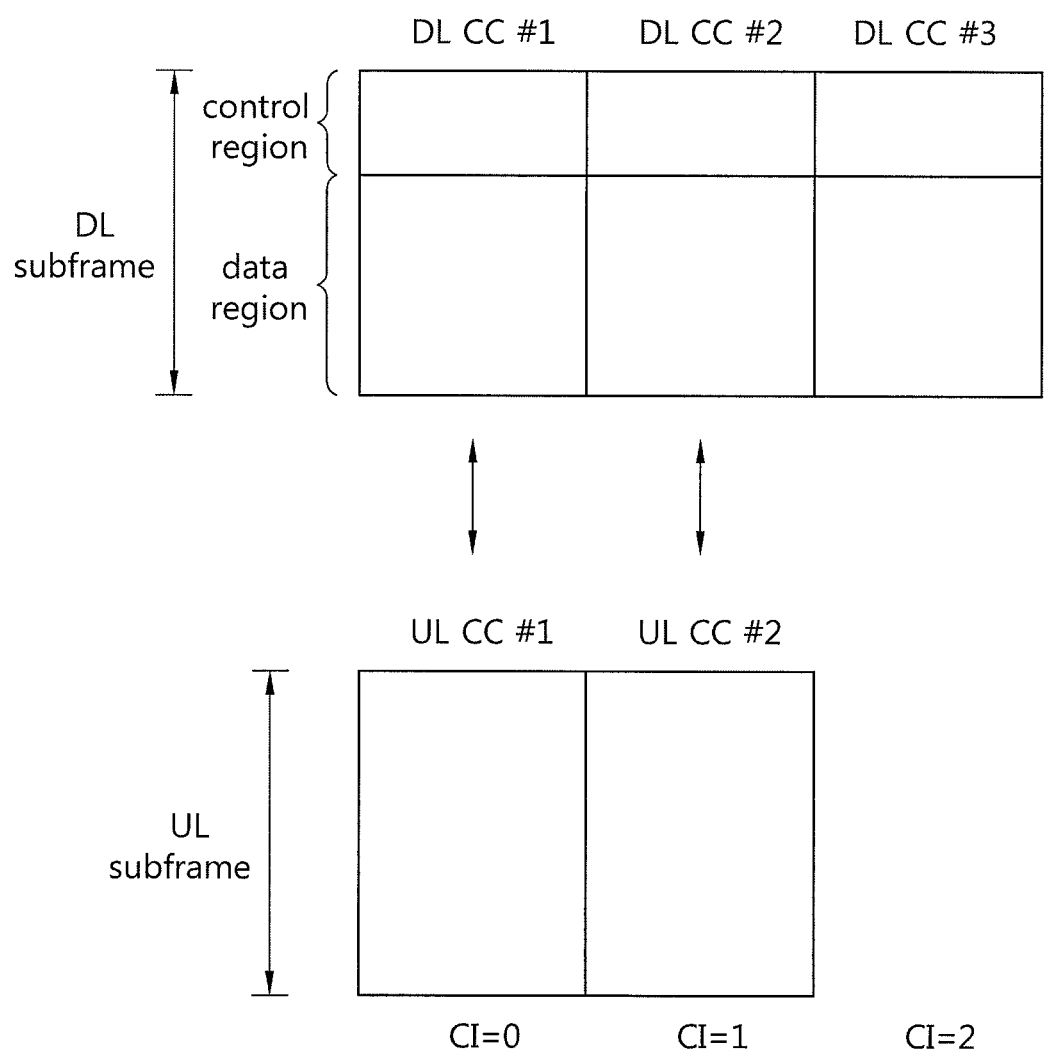
FIG. 5 shows an example of multiple carriers.

FIG. 5 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is configured always. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

Now, ACK/NACK transmission for HARQ in 3GPP LTE time division duplex (TDD) will be described.

A UL subframe and a DL subframe coexist in one radio frame in the TDD, unlike in frequency division duplex (FDD). In general, the number of UL subframes is less than the number of DL subframes. Therefore, in preparation for a case in which the UL subframes for transmitting an ACK/NACK signal are insufficient, it is supported that a plurality of ACK/NACK signals for a plurality of DL transport blocks are transmitted in one UL subframe.

According to the section 10.1 of 3GPP TS 36.213 V8.7.0 (2009-05), two ACK/NACK modes, i.e., channel selection and bundling, are introduced.

First, the bundling is an operation in which, if all of PDSCHs (i.e., DL transport blocks) received by a UE are successfully decoded, ACK is transmitted, and otherwise NACK is transmitted. This is called an AND operation.

However, the bundling is not limited to the AND operation, and may include various operations for compressing ACK/NACK bits corresponding to a plurality of transport blocks (or codewords). For example, the bundling may indicate a count indicating the number of ACKs (or NACKs) or the number of consecutive ACKs.

Second, the channel selection is also called ACK/NACK multiplexing. The UE transmits the ACK/NACK by selecting one of a plurality of PUCCH resources.

Table 5 below shows a DL subframe n-k associated with a UL subframe n depending on the UL-DL configuration in 3GPP LTE. Herein, k∈K, where M is the number of elements of a set K.

TABLE 5

| UL-DL config- uration | Subframe n | | | | | | | | |
|---|---|---|---|---|---|---|---|---|---|
| | 0 | 1 | 2 | 3 | 4 | 5 | 6 | 7 | 8 |
| 0 | — | — | 6 | — | 4 | — | — | 6 | — |
| 1 | — | — | 7, 6 | 4 | — | — | — | 7, 6 | 4 |
| 2 | — | — | 8, 7, 4, 6 | — | — | — | — | 8, 7, 4, 6 | — |
| 3 | — | — | 7, 6, 11 | 6, 5 | 5, 4 | — | — | — | — |
| 4 | — | — | 12, 8, 7, 11 | 6, 5, 4, 7 | — | — | — | — | — |
| 5 | — | — | 13, 12, 9, 8, 7, 5, 4, 11, 6 | — | — | — | — | — | — |
| 6 | — | — | 7 | 7 | 5 | — | — | 7 | 7 |

Assume that M DL subframes are associated with a UL subframe n, where M=4. Since 4 PDCCHs can be received from 4 DL subframes, the UE can acquire 4 PUCCH resources $n^{(1)}_{PUCCH,0}$, $n^{(1)}_{PUCCH,1}$, $n^{(1)}_{PUCCH,2}$, $n^{(1)}_{PUCCH,3}$. When b(0) and b(1) denote encoded 2-bit ACK/NACK, an example of channel selection is shown in Table 6 below.

TABLE 6

| HARQ-ACK(1), HARQ-ACK(2), HARQ-ACK(3), HARQ-ACK(4) | Resource index | b(0), b(1) |
|---|---|---|
| ACK, ACK, ACK, ACK | $n^{(1)}_{PUCCH, 1}$ | 1, 1 |
| ACK, ACK, ACK, NACK/DTX | $n^{(1)}_{PUCCH, 1}$ | 1, 0 |
| NACK/DTX, NACK/DTX, NACK, DTX | $n^{(1)}_{PUCCH, 2}$ | 1, 1 |
| ACK, ACK, NACK/DTX, ACK | $n^{(1)}_{PUCCH, 1}$ | 1, 0 |
| NACK, DTX, DTX, DTX | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 0, 1 |
| NACK/DTX, NACK/DTX, NACK/DTX, NACK | $n^{(1)}_{PUCCH, 3}$ | 1, 1 |
| ACK, NACK/DTX, ACK, NACK/DTX | $n^{(1)}_{PUCCH, 2}$ | 0, 1 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |
| NACK/DTX, ACK, ACK, ACK | $n^{(1)}_{PUCCH, 3}$ | 0, 1 |
| NACK/DTX, NACK, DTX, DTX | $n^{(1)}_{PUCCH, 1}$ | 0, 0 |
| NACK/DTX, ACK, ACK, NACK/DTX | $n^{(1)}_{PUCCH, 2}$ | 1, 0 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| DTX, DTX. DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or a corresponding PDCCH cannot be detected.

For example, if the UE successfully receives four DL transport blocks in four DL subframes, the UE performs QPSK modulation on bits (1,1) by using $n^{(1)}_{PUCCH,2}$, and transmits the modulated bits by using the PUCCH format 1b as an ACK/NACK response. If the UE fails to decode the DL transport block and succeeds in the decoding of the remaining transport blocks in a $1^{st}$ (i=0) DL subframe, the UE performs QPSK modulation on bits (0, 1) by using $n^{(1)}_{PUCCH,3}$, and transmits the modulated bits by using the PUCCH format 1b as an ACK/NACK response.

The conventional PUCCH format 1b can transmit only 2-bit ACK/NACK. However, channel selection is used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of a DL subframe (or PDCCH).

Assume that M=4, and the BS transmits 4 DL transport blocks through 4 DL subframes. The UE misses the PDCCH in the $2^{nd}$ DL subframe and thus cannot receive a $2^{nd}$ transport block at all, and can receive only the remaining $1^{st}$ and $3^{rd}$ transport blocks. In this case, if bundling is used, the UE erroneously transmits ACK.

In order to solve this error, a downlink assignment index (DAI) is included in a DL grant on the PDCCH. The DAI indicates an accumulative number of the PDCCH having assigned PUSCH transmission. A value of the 2-bit DAI is sequentially increased from 1, and a modulo-4 operation is applicable again from DAI=4. If M=5 and all of 5 DL subframes are scheduled, the DAI can be included in a corresponding PDCCH in the order of DAI=1, 2, 3, 4, 1.

When considering a TDD configuration with DL:UL=9:1, a DAI value to which a modulo-4 operation is applied can be expressed as follows.

DAI for $1^{st}$, $5^{th}$ or $9^{th}$ scheduled PDSCH=1
DAI for $2^{nd}$ or $6^{th}$ scheduled PDSCH=2
DAI for $3^{rd}$ or $7^{th}$ scheduled PDSCH=3
DAI for $4^{th}$ or $8^{th}$ scheduled PDSCH=4

Figure 6:
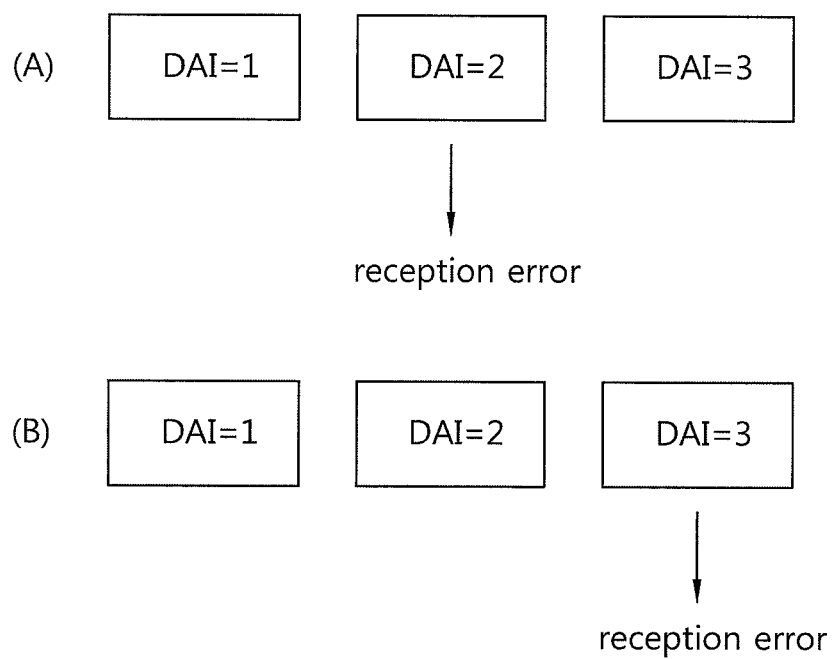
FIG. 6 shows examples of error detection using a downlink assignment index (DAI).

FIG. 6 shows examples of error detection using a DAI.

In FIG. 6A, a UE misses a $2^{nd}$ DL subframe, and thus cannot receive DAI=2. In this case, the UE receives DAI=3, and thus can know missing of a DL subframe corresponding to DAI=2.

In FIG. 6B, the UE misses a $3^{rd}$ DL subframe, and thus cannot receive DAI=3. In this case, the UE cannot know missing of the $3^{rd}$ DL subframe. However, in 3GPP LTE, a PUCCH is configured on the basis of a $1^{st}$ CCE of a last received PDCCH so that a BS can know missing of the DL subframe. That is, the UE transmits ACK/NACK by using a PUCCH resource based on a PUCCH resource of a DL subframe corresponding to DAI=2. The BS can know the missing of the $3^{rd}$ DL subframe since the ACK/NACK is received by using the PUCCH resource corresponding to the DL subframe with DAI=2 rather than the DL subframe with DAI=3.

Meanwhile, as a plurality of serving cells are used, an additional PUCCH format 3 is under discussion in addition to the PUCCH format of the conventional 3GPP LTE, in preparation for a case in which the number of ACK/NACK bits is insufficient.

Figure 7:
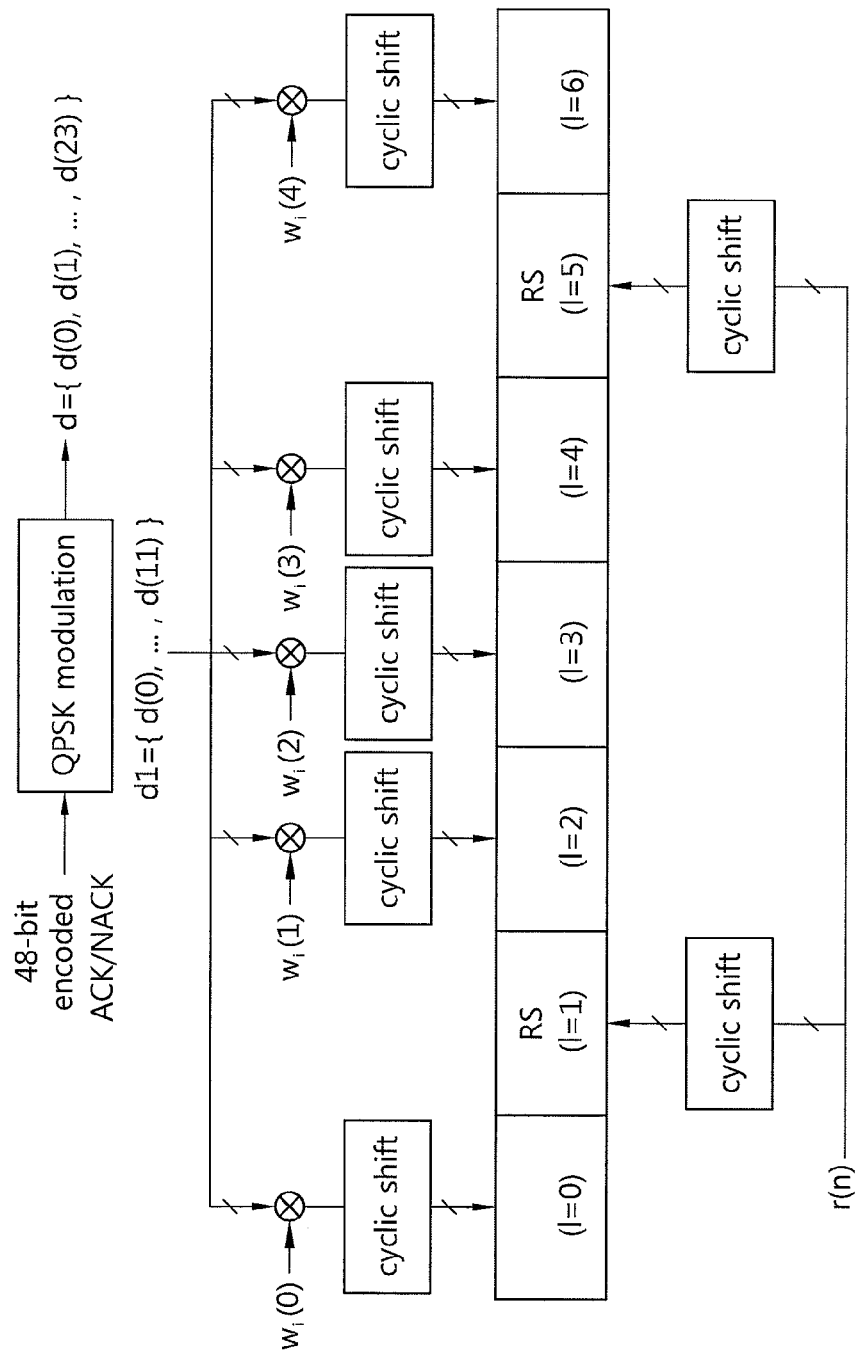
FIG. 7 shows an example of a structure of a PUCCH format 3 in a normal CP.

FIG. 7 shows an example of a structure of a PUCCH format 3 in a normal CP.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence d={d(0), d(1), . . . , d(23)} is generated by performing QPSK modulation on a 48-bit encoded ACK/NACK signal. d(n) (n=0, 1, . . . , 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d 1={d(0), . . . , d(11)} and d2={d(12), . . . , d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 5 below can be selected in accordance with an orthogonal sequence index i.

TABLE 7

| Index (i) | [$w_i(0)$, $w_i(1)$, $w_i(2)$, $w_i(3)$, $w_i(4)$] |
|---|---|
| 0 | [+1, +1, +1, +1, +1] |
| 1 | [+1, $e^{j2\pi/5}$, $e^{j4\pi/5}$, $e^{j6\pi/5}$, $e^{j8\pi/5}$] |
| 2 | [+1, $e^{j4\pi/5}$, $e^{j8\pi/5}$, $e^{j2\pi/5}$, $e^{j6\pi/5}$] |
| 3 | [+1, $e^{j6\pi/5}$, $e^{j2\pi/5}$, $e^{j8\pi/5}$, $e^{j4\pi/5}$] |
| 4 | [+1, $e^{j8\pi/5}$, $e^{j6\pi/5}$, $e^{j4\pi/5}$, $e^{j2\pi/5}$] |

Two slots in the subframe can use different orthogonal sequence indices.

Each spread symbol sequence is cyclically shifted by a cell-specific CS value $n^{cell}_{cs}(n_s,1)$. Each cyclically shifted symbol sequence is transmitted by being mapped to a corresponding data OFDM symbol.

$n^{cell}_{cs}(n_s,1)$ is a cell-specific parameter determined by a pseudo-random sequence which is initialized on the basis of a physical cell identity (PCI). $n^{cell}_{cs}(n_s,1)$ varies depending on a slot number $n_s$ in a radio frame and an OFDM symbol number 1 in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

A resource index for the PUCCH formats 1a/1b is acquired from a resource of a PDCCH received most recently. A resource index for the PUCCH format 3 is indicated by an ACK/NACK resource indicator (ART).

First, the BS reports a plurality of available candidate resource indices to the UE by using a higher layer message such as an RRC message. Further, the BS reports a resource index selected from the plurality of candidate resource indices by using a DL grant on a PDCCH. A field indicating the selected resource index in the DL grant is called an ARI.

For example, the BS reports four candidate resource indices to the UE by using the RRC message. Further, the BS uses the ARI on the PDCCH for scheduling the PDSCH to indicate one of the four candidate resource indices. The PUCCH format 3 is determined from the selected resource index.

In order to prevent the increase in the number of bits of the DL grant, the ARI uses a transmit power command (TPC) of the conventional DCI.

Now, semi-persistent scheduling (SPS) will be described.

In general, a UE first receives a DL grant on a PDCCH, and subsequently receives a transport block through a PDSCH indicated by the DL grant. This implies that PDCCH monitoring is accompanied in every transport block, which is called dynamic scheduling.

The SPS pre-defines a PDSCH resource, and the UE receives a transport block through the pre-defined resource without PDCCH monitoring.

Figure 8:
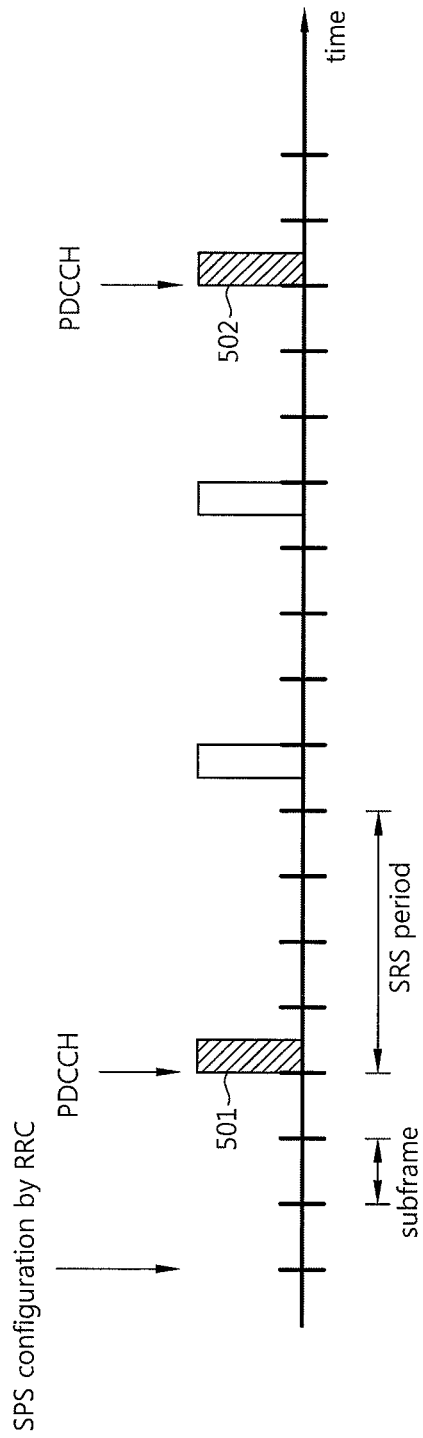
FIG. 8 shows an example of semi-persistent scheduling (SPS) in 3GPP LTE.

FIG. 8 shows an example of SPS in 3GPP LTE. Although DL SPS is shown herein, the same is also applicable to UL SPS.

First, a BS sends an SPS configuration to a UE by using radio resource control (RRC). The SPS configuration includes an SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When NDI=0 is included in DCI on the PDCCH 501, combinations of values of several fields (e.g., a transmit power command (TPC), a cyclic shift (CS) of a demodulation reference signal (DMRS) a modulation and coding scheme (MCS), a redundancy version (RV), an HARQ process number, and a resource allocation) included in the DCI are used in SPS activation and deactivation.

When the SPS is activated, even if a DL grant on the PDCCH is not received, the UE receives a transport block on a PDSCH at an SPS period. The PDSCH received without the PDCCH is called an SPS PDSCH.

Thereafter, the UE monitors a PDCCH 502 in which a CRC is masked with the SPS-C-RNTI, and confirms deactivation of the SPS.

According to 3GPP LTE, the PDCCH indicating the activation of the SPS does not require an ACK/NACK response, but the PDCCH indicating the deactivation of the SPS requires the ACK/NACK response. Hereinafter, a DL transport block may include the PDCCH indicating the deactivation of the SPS.

According to the conventional PUCCH formats 1a/1b, a resource index $n^{(1)}_{PUCCH}$ is acquired from the PDCCH. However, according to the SPS, the PDCCH associated with the PDSCH is not received, and thus a pre-assigned resource index is used.

For the SPS, the BS reports a plurality of candidate resource indices to the UE by using an RRC message. The BS reports a resource index in use among the plurality of candidate resource indices to the UE through the PDCCH 501 which activates the SPS.

Now, ACK/NACK transmission in a TDD system according to the present invention will be described.

An ACK/NACK state for HARQ indicates one of the following three states.
  ACK: a decoding success of a transport block (or codeword) received on a PDSCH.
  NACK: a decoding failure of the transport block (or codeword) received on the PDSCH.
  DTX: a failure in the reception of the transport block on the PDSCH. In case of dynamic scheduling, a failure in the reception of a PDCCH.

Hereinafter, NACK and DTX will be treated equally unless specified otherwise. That is, the ACK/NACK state has two types, i.e., ACK and NACK/DTX.

The scheduled PDSCH may include a dynamic PDSCH and a static PDSCH. The dynamic PDSCH is a PDSCH with a corresponding PDCCH. That is, the dynamic PDSCH is a PDSCH indicated by the PDCCH. The static PDSCH is a PDSCH without a corresponding PDCCH. An example of the static PDSCH is an SPS PDSCH.

The PDCCH is a PDCCH carrying a DL grant. The PDCCH indicating an SPS release also requires ACK/NACK transmission. For clarity of explanation, ACK/NACK for the PDCCH indicating the SPS release is not considered in the following description. However, those ordinarily skilled in the art will easily apply the present invention to the PDCCH indicating the SPS release.

With the introduction of a plurality of serving cells, a bundling method is proposed as follows.
  Codeword (CW) bundling: ACK/NACK for a plurality of codewords is bundled when the plurality of codewords (or transport blocks) are transmitted on the PDSCH. The 'bundling' implies that an ACK/NACK state is regarded as ACK when the ACK/NACK state is ACK for all of the plurality of codewords is ACK, and otherwise the ACK/NACK state is regarded as NACK.
  CC bundling: ACK/NACK is bundled across a plurality of serving cells.
  Subframe bundling: ACK/NACK is bundled across a plurality of subframes of each serving cell.

In order to express the ACK/NACK response by using a smaller number of bits, the following ACK/NACK payload configuration can be taken into account.
  ACK/NACK payload 1: No bundling is applied.
  ACK/NACK payload 2: Only CW bundling is applied for a secondary cell other than a primary cell.
  ACK/NACK payload 3: CW bundling is applied for all serving cells.

The following three methods can be considered as ACK/NACK channel selection with respect to the number of ACK/NACK bits and the number of PUCCH resources in use. Herein, the ACK/NACK bit may imply a bit which is output after bundling is applied.
  (1) 2-bit channel selection: transmission of a 2-bit ACK/NACK response using two PUCCH resources.
  (2) 3-bit channel selection: transmission of a 3-bit ACK/NACK response using 3 PUCCH resources.
  (3) 4-bit channel selection: transmission of a 4-bit ACK/NACK response using 4 PUCCH resources.

A method of differently interpreting TPC fields of the primary cell and the secondary cell is proposed when a plurality of serving cells are configured for the UE. A TPC field in the DL grant of the primary cell is used for uplink power control as a TPC. A TPC field in the DL grant of the secondary cell is used for PUCCH resource configuration as an ART.

For example, assume that the PUCCH format 3 is determined for ACK/NACK transmission. Uplink power is controlled on the basis of a TPC in the DL grant of the primary cell of the UE, and the PUCCH format 3 is determined on the basis of the ARI in the DL grant of the secondary cell.

However, if the UE receives the DL grant only from the primary cell (this is called a 'PCC-only case'), the ARI cannot be received and thus it is impossible to determine the PUCCH format 3.

As one of methods for solving the aforementioned problem, it can be considered a method of acquiring a resource index from a resource of a PDCCH for scheduling a PDSCH of the primary cell (this is called a PCC-PDCCH) in the PCC-only case. This implies ACK/NACK transmission based on the PUCCH format 1b using ACK/NACK bundling or channel selection. The PUCCH format 1b can express only 2 bits, and the aforementioned 2-bit/3-bit/4-bit channel selection is used. However, if a TDD configuration with M>2 is used and the primary cell is determined to a MIMO transmission mode, it is required to perform CW bundling to use the aforementioned 2-bit/3-bit/4-bit channel selection.

Therefore, in a case other than the PCC-only case, it is required to transition to an operation for performing CW bundling in the PCC-only case while transmitting individual ACK/NACK for each transport block by using the PUCCH format 3. This may cause unnecessary retransmission due to a complex operation and CW bundling. If one of two transport blocks is NACK, the NACK is transmitted for the two transport blocks according to CW bundling. Therefore, the BS retransmits all of the two transport blocks.

Figure 9:
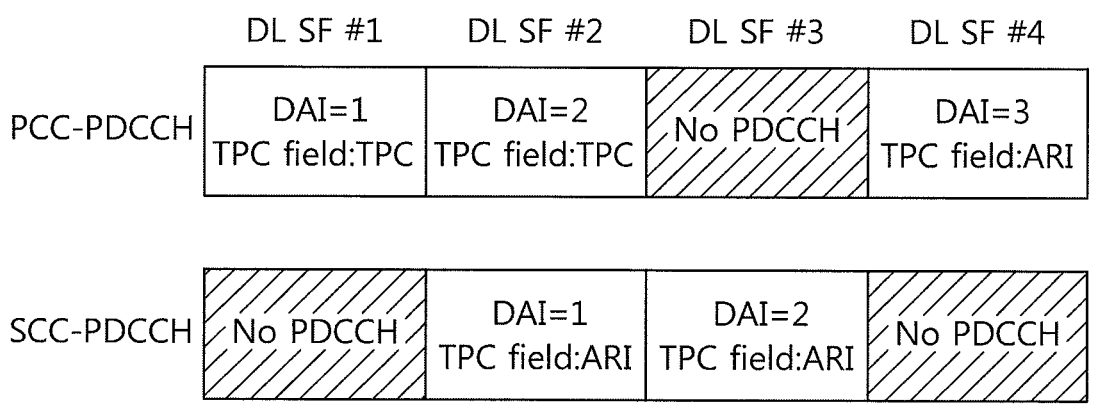
FIG. 9 shows ACK/NACK transmission according to an embodiment of the present invention.

FIG. 9 shows ACK/NACK transmission according to an embodiment of the present invention. Herein, M=4, and subframes (SFs) #1, #2, #3, and #4 are present in a primary cell and a secondary cell. The respective subframes may be contiguous or non-contiguous.

To avoid CW bundling in a PCC-only case, it is proposed to use a TPC field in a PCC-PDCCH with a DAI value 1 or 2 as a TPC and a TPC field in a PCC-PDCCH with a DAI value other than 1 or 2 as an ART.

Upon receiving only the PCC-PDCCH with the DAI value 1 and/or 2, a UE performs ACK/NACK channel selection for the PUCCH formats 1a/1b on the basis of a resource index acquired from a resource of a corresponding PCC-PDCCH. Upon receiving an SCC-PDCCH (i.e., PDCCH of the secondary cell) and/or a PCC-PDCCH with a DAI value other than 1 or 2, ACK/NACK is transmitted by using the PUCCH format 3 determined on the basis of a resource index acquired based on the ARI.

Upon receiving only a PDSCH without a PDCCH, that is, an SPS PDSCH, and the PCC-PDCCH with the DAI value 1 and/or 2, the UE can perform ACK/NACK channel selection for the PUCCH formats 1a/1b on the basis of a resource index selected for SPS and a resource index acquired from a resource of a corresponding PCC-PDCCH.

Upon receiving only the PCC-PDCCH with the DAI value 1 and/or 2, the following ACK/NACK resource selection can be taken into account.

If a primary cell is set to a non-MIMO transmission mode, 2-bit channel selection is applied irrespective of an ACK/NACK payload. 2-bit ACK/NACK is an ACK/NACK response for a PDSCH indicated by the PCC-PDCCH with the DAI value 1 and/or 2.

If the primary cell is set to a MIMO transmission mode, 4-bit channel selection is applied for an ACK/NACK payload 1 or an ACK/NACK payload 2. 4-bit ACK/NACK is an ACK/NACK response for two transport blocks to be scheduled by the PCC-PDCCH with the DAI value 1 (herein, two transport blocks are transmitted on one PDSCH) and two transport blocks to be scheduled by the PCC-PDCCH with the DAI value 2. 2-bit channel selection or 4-bit channel selection is applied for an ACK/NACK payload 3. The 2-bit ACK/NACK is an ACK/NACK response for bundling ACK/NACK of two transport blocks to be scheduled by the PCC-PDCCH with the DAI value 1 and bundling ACK/NACK of two transport blocks to be scheduled by the PCC-PDCCH with the DAI value 2.

Figure 10:
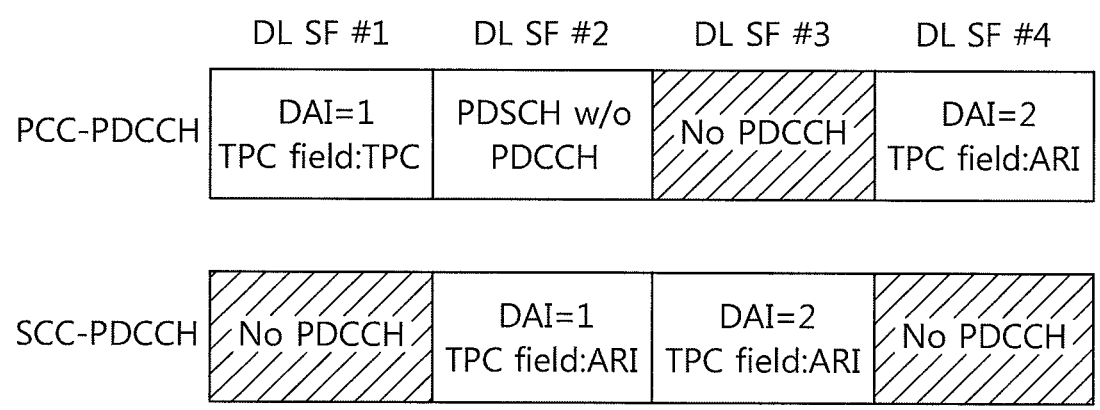
FIG. 10 shows ACK/NACK transmission according to another embodiment of the present invention.

FIG. 10 shows ACK/NACK transmission according to another embodiment of the present invention. Herein, M=4, and subframes (SFs) #1, #2, #3, and #4 are present in a primary cell and a secondary cell. The respective subframes may be contiguous or non-contiguous.

When an SPS-PDSCH is received (or during SPS is activated), it is proposed to use a TPC field in a PCC-PDCCH with a DAI value 1 as a TPC and a TPC field in a PCC-PDCCH with a DAI value other than 1 as an ARI.

Upon receiving only one SPS PDSCH or only the PCC-PDCCH with the DAI value 1 together with the SPS PDSCH, the UE performs channel selection on the basis of a resource index selected for SPS and a resource index acquired from a resource of the PCC-PDCCH. Upon receiving an SCC-PDCCH (i.e., PDCCH of the secondary cell) and/or a PCC-PDCCH with a DAI value other than 1, ACK/NACK is transmitted by using the PUCCH format 3 determined on the basis of a resource index acquired based on the ARI.

Upon receiving only the SPS PDSCH and/or the PCC-PDCCH with the DAI value 1, the following ACK/NACK resource selection can be taken into account.

If a primary cell is set to a non-MIMO transmission mode, 2-bit channel selection is applied irrespective of an ACK/NACK payload. 2-bit ACK/NACK is an ACK/NACK response for the SPS PDSCH and a PDSCH indicated by the PCC-PDCCH with the DAI value 1. Channel selection can be performed on the basis of a resource index for SPS and a resource index based on the PCC-PDCCH with the DAI value 1.

If the primary cell is set to a MIMO transmission mode, 3-bit channel selection is applied for an ACK/NACK payload 1 or an ACK/NACK payload 2. 3-bit ACK/NACK is an ACK/NACK response for two transport blocks to be scheduled by the SPS PDSCH and the PCC-PDCCH with the DAI value 1. 2-bit channel selection or 3-bit channel selection is applied to an ACK/NACK payload 3. 2-bit ACK/NACK is an ACK/NACK response bundling ACK/NACK of two transport blocks to be scheduled by the SPS PDSCH and the PCC-PDCCH with the DAI value 1. Channel selection can be performed on the basis of a resource index for SPS and a resource index based on the PCC-PDCCH with the DAI value 1.

Now, an example of applying the embodiment of FIG. 10 to the PUCCH format 3 and the PUCCH format 1b will be described in greater detail.

Figure 11:
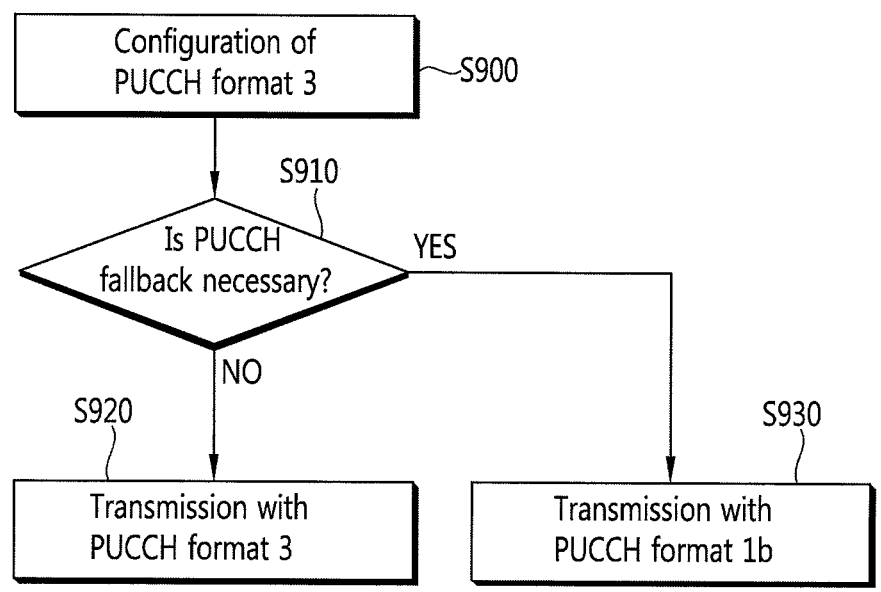
FIG. 11 is a flowchart showing ACK/NACK transmission according to an embodiment of the present invention.

FIG. 11 is a flowchart showing ACK/NACK transmission according to an embodiment of the present invention.

For TDD HARQ ACK/NACK transmission, a UE is set to the PUCCH format 3 (step S900). Assume that M>1, and one or more serving cells are configured. A BS reports a plurality of candidate resource indices for the PUCCH format 3 to the UE through an RRC message.

The UE determines whether to perform PUCCH fallback (step S910). The PUCCH fallback implies that, even if the PUCCH format 3 is determined for ACK/NACK transmission, the PUCCH format 1b is used for ACK/NACK transmission instead of the PUCCH format 3 in a specific condition. The UE can determine whether to use the PUCCH format 3 or to use channel selection according to the specific condition.

The specific condition may be a case in which one or two PDSCHs are received only in a primary cell. The PDSCH may be a dynamic PDSCH indicated by a PDCCH (a PDCCH indicating an SPS release is also included therein) or a PDSCH without a PDCCH. For example, the specific condition may be a case in which an SPS PDSCH and a PDCCH with a DAI value 1 are received in the primary cell. Alternatively, the specific condition may be a case in which only the SPS PDSCH is received in the primary cell.

The PUCCH fallback is not applied if the PDCCH is received in a secondary cell or if a PDCCH with a DAI value other than 1 is received. This is because the PDCCH of the secondary cell or the PDCCH with the DAI value other than 1 includes an ARI and thus can determine the PUCCH format 3.

If the PUCCH fallback is not applied, the UE determines the PUCCH format 3 on the basis of the ARI, and transmits an ACK/NACK response (step S920). The ACK/NACK response may include individual ACK/NACK bits for transport blocks of respective serving cells.

If the PUCCH fallback is applied, the UE determines the PUCCH format 1b on the basis of channel selection, and transmits the ACK/NACK transmission (step S930).

More specifically, assume that one transport block is transmitted through an SPS PDSCH and/or a PDSCH indicated by the PDCCH with the DAI value 1. This is a case in which the primary cell is set to a non-MIMO transmission mode. Channel selection can be expressed by the following table.

TABLE 8

| HARQ-ACK(1), HARQ-ACK(2) | Resource index | 2-bit ACK/NACK b(0), b(1) |
|---|---|---|
| ACK, ACK | $n^{(1)}_{PUCCH,1}$ | 1, 0 |
| ACK, NACK/DTX | $n^{(1)}_{PUCCH,0}$ | 1, 1 |
| NACK/DTX, ACK | $n^{(1)}_{PUCCH,1}$ | 0, 1 |
| NACK, NACK/DTX | $n^{(1)}_{PUCCH,0}$ | 0, 0 |
| DTX, NACK/DTX | No transmission | |

HARQ-ACK(1) is ACK/NACK/DTX for a transport block of the SPS PDSCH. HARQ-ACK(2) is ACK/NACK/DTX for a transport block of a PDSCH indicated by the PDCCH with the DAI value 1.

$n^{(1)}_{PUCCH,0}$ is a pre-defined value for the SPS PDSCH. That is, $n^{(1)}_{PUCCH,0}$ is a resource index given for the SPS PDSCH when SPS is activated.

$n^{(1)}_{PUCCH,1}$ is a resource index acquired from a resource of the PDCCH with the DAI value 1.

2-bit ACK/NACK and a resource index are determined from Table 8 above.

Assume that QPSK modulation is given as follows.

TABLE 9

| b(0), b(1) | Constellation |
|---|---|
| 0, 0 | 1 |
| 0, 1 | −j |
| 1, 0 | j |
| 1, 1 | −1 |

By using QPSK modulation of Table 9 above, a modulation symbol d(0) is generated from 2-bit ACK/NACK. The PUCCH format 1b shown in FIG. 3 is configured on the basis of the determined resource index, and the modulation symbol d(0) can be transmitted by using the PUCCH format 1b.

Assume that one transport block is transmitted through the SPS PDSCH, and a first transport block and a second transport block are transmitted through the PDSCH indicated by the PDCCH with the DAI value 1. This is a case in which the primary cell is set to a MIMO transmission mode Channel selection can be expressed by the following table.

TABLE 10

| HARQ-ACK(1), HARQ-ACK(2), HARQ-ACK(3) | Resource index | 2-bit ACK/NACK b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No transmission | |

TABLE 10-continued

| HARQ-ACK(1), HARQ-ACK(2), HARQ-ACK(3) | Resource index | 2-bit ACK/NACK b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No transmission | |

HARQ-ACK(1) is ACK/NACK/DTX for a transport block of the SPS PDSCH. HARQ-ACK(2) is ACK/NACK/DTX for the first transport block of a PDSCH indicated by the PDCCH with the DAI value 1. HARQ-ACK(3) is ACK/NACK/DTX for the second transport block of the PDSCH indicated by the PDCCH with the DAI value 1.

$n^{(1)}_{PUCCH,0}$ is a pre-defined value for the SPS PDSCH. That is, $n^{(1)}_{PUCCH,0}$ is a resource index given for the SPS PDSCH when SPS is activated.

$n^{(1)}_{PUCCH,1}$ is a resource index acquired from a resource of the PDCCH with the DAI value 1.

$n^{(1)}_{PUCCH,2}$ can be acquired on the basis of $n^{(1)}_{PUCCH,1}$. For example, it can be determined as $n^{(1)}_{PUCCH,2} = n^{(1)}_{PUCCH,1} + 1$.

Figure 12:
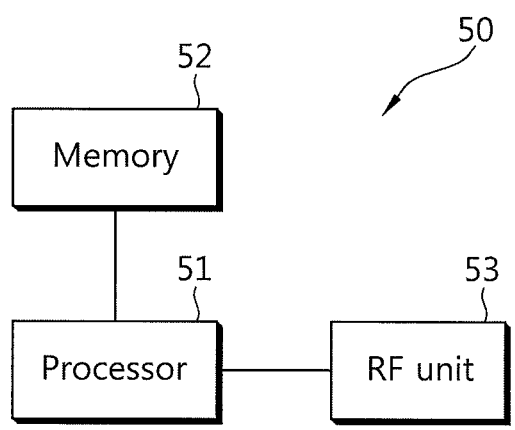
FIG. 12 is a block diagram showing a wireless apparatus for implementing an embodiment of the present invention.

FIG. 12 is a block diagram showing a wireless apparatus for implementing an embodiment of the present invention.

A wireless apparatus 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 may implement the proposed functions, procedures, and/or methods. The processor 51 can implement the operation of a UE according to the embodiments of FIG. 9 to FIG. 11. The processor 51 may configure ACK/NACK, and may transmit the ACK/NACK through a PUCCH.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of reporting control information in a wireless communication system in which a plurality of downlink time divisional duplex (TDD) subframes are associated with an uplink TDD subframe, the method comprising:
   receiving, by a user equipment (UE) supporting at least one cell including a primary cell, resource allocation information used for a first physical uplink control channel (PUCCH) format;
   selecting, by the UE, a PUCCH format among a plurality of PUCCH formats including the first PUCCH format and a second PUCCH format,
   wherein the second PUCCH format is selected if the UE receives a first physical downlink shared channel (PDSCH) in one of the plurality of downlink TDD subframes on the primary cell,
   wherein the UE receives a second PDSCH with a downlink assignment index (DAI) in one of the plurality of downlink TDD subframes on the primary cell,
   wherein the UE does not receive a first physical downlink control channel (PDCCH) corresponding to the first PDSCH on the primary cell, and
   wherein the UE receives a second PDCCH corresponding to the second PDSCH; and
   in response to the first and second PDSCHs, transmitting, by the UE, a positive-acknowledgement (ACK)/negative-acknowledgement (NACK) signal by using the selected PUCCH format.

2. The method of claim 1, wherein the first PUCCH format includes PUCCH format 3 and the second PUCCH format includes PUCCH format 1b.

3. The method of claim 1, wherein the ACK/NACK signal is configured by 2 bit ACK/NACK information for the first and second PDSCHs.

4. The method of claim 3, wherein the 2 bit ACK/NACK information is modulated with Quadrature Phase Shift Keying (QPSK).

5. The method of claim 1, wherein the DAI indicates an accumulative number of PDCCHs with assigned PDSCH transmissions.

6. The method of claim 1, wherein the DAI has a value of 1 when the UE selects the second PUCCH format.

7. A user equipment (UE) in a wireless communication system in which a plurality of downlink time divisional duplex (TDD) subframes are associated with an uplink TDD subframe, the UE comprising:
   a radio frequency unit configured to support at least one cell including a primary cell; and
   a processor coupled to the radio frequency unit and configured to:
   receive resource allocation information used for a first physical uplink control channel (PUCCH) format;
   select a PUCCH format among a plurality of PUCCH formats including the first PUCCH format and a second PUCCH format,
   wherein the second PUCCH format is selected if the UE receives a first physical downlink shared channel (PDSCH) in one of the plurality of downlink TDD subframes on the primary cell,
   wherein the UE receives a second PDSCH with a downlink assignment index (DAI) in one of the M downlink TDD subframes on the primary cell,
   wherein the UE does not receive a first physical downlink control channel (PDCCH) corresponding to the first PDSCH on the primary cell, and
   wherein the UE receives a second PDCCH corresponding to the second PDSCH, and
   in response to the first and second PDSCHs, instruct the radio frequency unit to transmit a positive-acknowledgement (ACK)/negative-acknowledgement (NACK) signal by using the selected PUCCH format.

8. The UE of claim 7, wherein the first PUCCH format includes PUCCH format 3 and the second PUCCH format includes PUCCH format 1b.

9. The UE of claim 7, wherein the ACK/NACK signal is configured by 2 bit ACK/NACK information for the first and second PDSCHs.

10. The UE of claim 9, wherein the 2 bit ACK/NACK information is modulated with a Quadrature Phase Shift Keying (QPSK).

11. The UE of claim 7, wherein the DAI indicates an accumulative number of PDCCHs with assigned PDSCH transmissions.

12. The UE of claim 7, wherein the DAI has a value of 1 when the UE selects the second PUCCH format.

* * * * *